United States Patent [19]
Bonk et al.

[11] Patent Number: 4,822,827
[45] Date of Patent: Apr. 18, 1989

[54] THERMOPLASTIC POLYURETHANES WITH HIGH GLASS TRANSITION TEMPERATURES

[75] Inventors: Henry W. Bonk, Wallingford; Augustin T. Chen; Benjamin S. Ehrlich, both of Cheshire, all of Conn.

[73] Assignee: The Dow Chemical Company, Midland, Mich.

[21] Appl. No.: 134,262

[22] Filed: Dec. 17, 1987

[51] Int. Cl.$^4$ ............................................. C08G 18/28
[52] U.S. Cl. ................................... 521/170; 521/173; 528/85
[58] Field of Search .................. 528/85; 521/173, 170

[56] References Cited

U.S. PATENT DOCUMENTS

| | | | |
|---|---|---|---|
| 3,823,060 | 7/1974 | McClung et al. | 161/190 |
| 3,900,446 | 8/1975 | McClung et al. | 525/440 |
| 4,101,529 | 7/1978 | Ammons | 528/67 |
| 4,261,946 | 4/1981 | Goyert et al. | 264/211 |
| 4,376,834 | 3/1983 | Goldwasser et al. | 521/159 |
| 4,393,186 | 7/1983 | Damico et al. | 528/49 |
| 4,567,236 | 1/1986 | Goldwasser et al. | 525/127 |

FOREIGN PATENT DOCUMENTS 60-96551  5/1985  Japan .

Primary Examiner—Maurice J. Welsh
Assistant Examiner—L. Henderson
Attorney, Agent, or Firm—James S. Rose

[57] ABSTRACT

Disclosed are novel high flexural modulus polyurethane plastics wherein a polyisocyanate and a particular combination of extenders including cycloalkane diol are reacted optionally in the presence of a minor proportion of high molecular weight polyol.

The polymers have outstanding resistance to high temperatures thereby expanding their utilities into higher temperature end-use environments than related prior art materials. Certain members of these new polymers are also possessed of outstanding optical clarity which thereby provides a combination of properties heretofore not available in a polyurethane. These polymers are easily melt-fabricated notwithstanding their inherent high temperature properties.

25 Claims, No Drawings

THERMOPLASTIC POLYURETHANES WITH HIGH GLASS TRANSITION TEMPERATURES

FIELD OF THE INVENTION

This invention relates to polyurethane plastics and is more particularly concerned with high flexural modulus polyurethane plastics having high temperature resistance and excellent optical clarity.

DESCRIPTION OF THE PRIOR ART

U.S. Pat. Nos. 4,376,834 and 4,567,236 introduced novel classes of polyurethane polymers to the plastics molding art. These materials are characterized by high impact resistance, stiffness, and other structural strength properties similar to nylon and other engineering thermoplastics. The advent of these materials has provided the molding industry with excellent alternative materials. While such polyurethanes find broad utility in a large number of applications calling for stiff, strong, molded parts, they are somewhat lacking when it comes to high temperature applications, for example, in excess of 100° C. If this temperature could be raised, then such materials would find even broader utility than they now enjoy. That is to say, if the polyurethane plastics disclosed in U.S. Pat. Nos. 4,376,834 and 4,567,236 could be prepared with the same physical properties as disclosed therein but with greater resistance to high temperatures, their utilities would be greatly expanded.

U.S. Pat. No. 4,101,529 discloses polyurethane compositions which are hard (Shore D at least 75), impact resistant, and have a heat distortion temperature of at least 88° C. when measured at 264 psi by the ASTM D-648 test. These materials are made by the reaction of cycloaliphatic polyisocyanates with mixtures of low molecular weight diol extenders such as ethylene glycol and low molecular weight active hydrogen containing materials having at least three active hydrogens such as trimethylolpropane, 1,2,6-hexanetriol and the like, and optionally a polymeric polycarbonate diol.

U.S. Pat. No. 4,393,186 discloses adhesive compositions containing a heat reactive phenolic resin, a thermoplastic polyurethane, and a vinyl solution polymer. The polyurethane ingredient is prepared from at least one polyisocyanate, at least one polyester polyol, at least one cycloaliphatic diol chain extending agent, and at least one monofunctional isocyanate reactive chain terminator. The process is quite specific in calling for excess isocyanate in respect of the polyester polyol and cycloaliphatic diol with the monofunctional isocyanate reactive compound reacting with the excess isocyanate. The teachings of this reference are somewhat ambiguous in calling for the preference of cycloaliphatic diols having from 4 to 10 carbon atoms such as the cyclobutane, cyclopentane, cyclohexane, cyclooctane, and cyclodecane diols (column 8, lines 10 to 11) while expressing at column 7, line 62 the preference for dimethylolcyclohexane which is actually an aliphatic diol by definition.

U.S. Pat. No. 4,261,946 calls for the modification of a thermoplastic polymer by introducing into the first inlet of an extruder the thermoplastic material (inclusive of polyurethanes, ABS polymers, polystyrene, polyesters, and the like) and adding through a second inlet the ingredients for a polyurethane including an organic polyisocyanate and a chain lengthening agent including mixtures of aliphatic glycols.

The means, and, compositions thereof, for extending the high temperature performance of the prior art polyurethanes beyond their disclosed limits have not heretofore been disclosed in the art.

SUMMARY OF THE INVENTION

This invention is directed to improved polyurethane plastics prepared from (i) an organic polyisocyanate, (ii) at least one chain extender, and (iii) 0 to about 25 parts by weight per 100 parts of total polyurethane reactants of a polyol having a functionality of at least 2 and a molecular weight of at least 500, wherein the improvement comprises employing as said extender (ii) a combination comprising (a) at least one cycloalkane diol and (b) at least one other extender.

The term "cycloalkane diol" means a diol obtained by replacing two nuclear hydrogen atoms of a cycloalkane by -OH groups said cycloalkane having from 4 to 12 cycloaliphatic carbon atoms and the resulting radical is inclusive of cyclobutylene, cyclopentylene, cyclohexylene, cycloheptylene, cyclooctylene radicals, and cycloalkane diols having the formula:

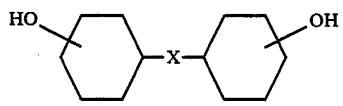

wherein X is selected from the group consisting of a direct bond, —SO$_2$—, —CO—, —O—, and lower-alkylene. The term cycloalkane diol also comprehends unsaturated diols provided the unsaturation is not at the ring carbon atoms bearing hydroxyl substituents.

The term "lower alkylene" means alkylene having 1 to 4 carbon atoms, inclusive, such as methylene, ethylene, propylene, butylene, isopropylidene, isobutylene, and the like.

The term "extender" means any chain extender known in the polyurethane art having a functionality from about 2 to about 3 and molecular weight in the range of from about 60 to about 400 but exclusive of cycloalkane diols.

In respect of their improvement over the prior art, the present polyurethane plastics are surprisingly characterized by secondary transition temperatures (T$_g$) of at least 125° C. Accordingly, these plastics enjoy all of the good mechanical properties of the prior art materials, particularly those set forth in U.S. Pat. Nos. 4,376,834 and 4,567,236 cited supra but at the same time extend their end use applications into much higher temperature ranges.

Additionally, and, even more surprisingly, the clear polyurethanes of this invention when prepared with non-aromatic isocyanates possess not only the high T$_g$ values but combine this advantage with excellent light transmission extending into the ultra violet region, i.e. optical clarity in addition to virtually no coloration as measured by yellow index determinations described below.

It follows, therefore, that the present polyurethanes find particular utility in the molding of under the hood auto and truck parts such as distributor covers, filter bowls, air-filter units and covers, containers and covers for electronic circuitry, and the like where resistance to high temperatures are called for; the optically clear polyurethanes find particular utility in medical devices which must withstand autoclaving conditions.

DETAILED DESCRIPTION OF THE INVENTION

The polyurethanes of the invention can be prepared using any of the methods currently employed in the polyurethane art for bringing together, in the presence or absence of solvents, polyisocyanates, extenders, and optionally high molecular weight polyols. This includes manual or mechanical mixing means and is inclusive of casting, reaction extrusion, reaction injection molding, and the like. For typical preparative methods see U.S. Pat. Nos. 4,376,834 and 4,567,236 whose disclosures relative to polyurethane plastic forming ingredients and preparative procedures are incorporated herein by reference.

Included in the preparative methods is the one-shot procedure and the prepolymer or quasi-prepolymer techniques. Use of the prepolymer techniques would, of course, be limited primarily to those formulations employing the polyol component (iii).

Preferably, the individual components are rendered substantially free from the presence of extraneous moisture using conventional procedures, for example, by heating under reduced pressure at a temperature above the boiling point of water at the pressure employed. The mixing of the reactants can be carried out at ambient temperature (i.e. of the order of 20° C. to 25° C.) and the resulting mixture is then generally heated to a temperature of the order of about 40° C. to about 130° C. preferably to a temperature of about 50° C. to about 100° C. Advantageously and preferably, one or more of the reactants is preheated to a temperature within the above ranges before the admixing is carried out. Advantageously, in a batch procedure, the heated reaction components, prior to admixture, are subjected to degassing in order to remove entrained bubbles of air or other gases before the reaction takes place. This is accomplished conveniently by reducing the pressure under which the components are maintained until no further evolution of bubbles occurs. The degassed reaction components are then admixed and transferred to suitable molds, extruders, flexible belts and the like and allowed to react and cure at temperatures of the order of ambient temperature to about 250° C. Pressure may also be applied during the curing reaction. The time required for curing will vary according to the temperature and also with the nature of the particular composition. The time required in any given case can be determined by a process of trial and error.

It is frequently desirable, but not essential, to include a catalyst in the reaction mixture employed to prepare the compositions of the invention. Any of the catalysts conventionally employed in the art to catalyze the reaction of an isocyanate with a reactive hydrogen containing compound can be employed for this purpose. A detailed listing of such catalysts is to be found, for example, in U.S. Pat. No. 4,202,957 at column 5, lines 45 to 67. This disclosure is incorporated herein specifically by reference. The amount of catalyst employed is generally employed within the range of about 0.02 to about 2.0 percent by weight based on the total weight of the reactants. In a particular embodiment of the one-shot procedure the reaction is carried out on a continuous basis using apparatus and procedures such as that which is disclosed in U. S. Pat. No. 3,642,964.

The compositions of the invention include both thermoplastic injection-moldable and thermoset resins. The thermoplastic resins are obtained by employing substantially difunctional polyisocyanates and difunctional extenders and a polyol having a functionality preferably not exceeding about 4, although polyols having higher functionalities can be employed where the weight proportion employed is in a low range. Since the amount by weight of the polyol employed in the compositions of the invention is relatively small, it is possible to employ such components having functionalities greater than two without detracting from the thermoplasticity of the resulting product. However, there is a limit of the degree to which the functionality of the polyol can be increased without losing the thermoplastic properties in the resulting product. As will be recognized by one skilled in the art, this limit will vary according to the nature of the polyol, its molecular weight, and the amount in which it is used. In general, the higher the molecular weight of the polyol the higher the functionality which can be employed without losing the thermoplastic properties in the polyurethane product.

Thermoset compositions can be obtained when polyisocyanates and/or extenders and polyols of functionalities greater than two are employed.

The novel and distinguishing feature of the present polymers over those in the incorporated references, and, the reason for their higher heat resistance, lies in the chain extender combination. The cycloalkane diol component may be a diol or mixture of more than one diol. It is to be understood that the cyclic ring may be substituted by inert groups in addition to the two hydroxyls. The term "inert group" means any group that does not react with hydroxyl and isocyanate groups or otherwise interfere with the polyurethane reaction. Typical of such inert groups are $C_1$ to $C_8$ alkyl, nitro, $C_1$ to $C_8$ alkoxy, halo inclusive of fluorine, chlorine, bromine, and iodine, cyano and the like.

A preferred group of such diols includes the cyclohexylene diols, the isopropylidenebis(cyclohexanols), and mixtures of these classes.

Illustrative but non-limiting of the diols are 1,3-cyclobutanediol, 1,3-cyclopentanediol, 1,2-cyclohexanediol, 1,3-cyclohexanediol, 1,4-cyclohexanediol, 2-cyclohexene-1,4-diol, 2-methyl-1,4-cyclohexanediol, 2-ethyl-1,4-cyclohexanediol, 1,3-cycloheptanediol, 1,4-cycloheptanediol, 2-methyl-1,4-cycloheptanediol, 4-methyl-1,3-cycloheptanediol, 1,3-cyclooctanediol, 1,4-cyclooctanediol, 1,5-cyclooctanediol, 5-methyl-1,4-cyclooctanediol, 5-ethyl-1,4-cyclooctanediol, 5-propyl-1,4-cyclooctanediol, 5-butyl-1,4-cyclooctanediol, 5-hexyl-1,4-cyclooctanediol, 5-heptyl-1,4-cyclooctanediol, 5-octyl-1,4-cyclooctanediol, and the like: 4,4'-methylenebis(cyclohexanol), 4,4'-methylenebis(2-methylcyclohexanol), 4,4'-methylenebis(3-methylcyclohexanol), 3,3'-methylenebis(cyclohexanol), 4,4'-ethylenebis(cyclohexanol), 4,4'-propylenebis(cyclohexanol), 4,4'-butylenebis(cyclohexanol), 4,4'-isopropylidenebis(cyclohexanol), 4,4'-isobutylenebis(cyclohexanol), 4,4'-dihydroxydicyclohexyl, 4,4'-carbonylbis(cyclohexanol), 3,3'-carbonylbis(cyclohexanol), 4,4'-sulfonylbis(cyclohexanol), 4,4'-oxybis(cyclohexanol), and the like; and mixtures of any of the above.

Preferred of the above species are those falling within the definition of cyclohexylene diols and 4,4'-isopropylidenebis(cyclohexanols).

Generally speaking, the cycloalkane diols are solids under ambient temperature conditions (circa 20° C.).

This does not preclude their use by directly adding them as a solid component to the urethane forming ingredients at the time of reaction but it is preferable to have them in liquid form either as the fused material or, more conveniently as a solution dissolved in another reactant. This is conveniently accomplished by dissolving them either in a polyol component if it be employed or in the other liquid extender component. If the other extender happens to be a solid also oftentimes it is possible to form a liquid mixture at room temperature simply by heating the solids together and allowing the solution to cool slowly.

The other extender component as defined above is not limited to hydroxyl containing extenders but can include other groups having active hydrogen atoms such as amine groups or mixtures of such extender types. Difunctional hydroxyl extenders are preferred as a class, and most preferred are the aliphatic diols having 2 to 10 carbon atoms, inclusive of bis(hydroxyalkyl)cycloalkanes of this carbon atom limitation because the two hydroxyls are substituted on aliphatic carbon atoms.

Illustrative of such extenders are aliphatic straight and branched chain diols having from about 2 to 10 carbon atoms, inclusive, in the chain. Illustrative of such diols are ethylene glycol, 1,3-propanediol, 1,4-butanediol, 1,5-pentanediol, 1,6-hexanediol, 1,2-propanediol, 1,3-butanediol, 2,3-butanediol, 1,3-pentanediol, 1,2-hexanediol, 3-methylpentane-1,5-diol, 1,9-nonanediol, 2-methyloctane-1,8-diol, 1,4-cyclohexanedimethanol, hydroquinone bis(hydroxyethyl)ether, and the like including mixtures of two or more such diols. The extenders, which can be used alone or in admixture with each other or any of the above diols, also include diethylene glycol, dipropylene glycol, tripropylene glycol, ethanolamine, N-methyl-diethanolamine, N-ethyldiethanolamine, and the like, as well as ester diols obtained by esterifying adipic, azelaic, glutaric and like aliphatic dicarboxylic acids with aliphatic diols such as those exemplified above utilizing from about 0.01 to about 0.8 mole of acid per mole of diol. Also included in the extenders which can be used in preparing the polyurethanes of the invention are the adducts obtained by reacting an aliphatic diol or triol such as 1,4-cyclohexanedimethanol, neopentyl glycol, hexane-1,2-diol, ethylene glycol, butane-1,4-diol, trimethylolpropane and the like with ε-caprolactone in a mole ratio of from 0.01 to 2 moles of caprolactone per mole of diol or triol. Trifunctional extenders such as glycerol, trimethylolpropane and the like can also be employed alone or in admixture with one or more of the above diols.

While any of the diol extenders described and exemplified above can be employed alone, or in admixture, it is preferred to use 1,4-butanediol, 1,6-hexanediol, neopentyl glycol, 1,4-cyclohexanedimethanol, ethylene glycol, and diethylene glycol, either alone or in admixture with each other or with one or more aliphatic diols previously named. Particularly preferred diols are 1,4-butanediol, 1,6-hexanediol and 1,4-cyclohexanedimethanol.

The relative proportions in which the extender components are employed is not important provided the cycloalkane diol is present in sufficient proportions to result in the polyurethanes produced having the minimum $T_g$ value set forth above. Furthermore, the proportions can be influenced by their relative solubilities in each other if an extender solution is to be employed. Generally speaking, if the extender component (b) is also a low melting solid, then the two extenders are simply heated together to form a solution prior to reaction with polyisocyanate.

Advantageously, the cycloalkane diol (a) is employed within a range of from about 10 to about 90 percent by weight and the extender (b) in the complementary amount of from 90 to 10 percent. Preferably, the proportions of (a) and (b) are from about 15 to about 60 percent by weight and from about 85 to about 40 percent, respectively.

Any of the organic diisocyanates and polyisocyanates previously employed in the preparation of polyurethanes can be employed for the present compositions. A preferred group of polyisocyanates comprises the aromatic diisocyanates, the cycloaliphatic diisocyanates, and mixtures thereof.

Illustrative isocyanates but non-limiting thereof are methylenebis(phenyl isocyanate) including the 4,4'-isomer, the 2,4'isomer and mixtures thereof, m- and p-phenylene diisocyanates, chlorophenylene diisocyanates, α,α'-xylylene diisocyanate, 2,4- and 2,6-toluene diisocyanate and the mixtures of these latter two isomers which are available commercially, tolidine diisocyanate, hexamethylene diisocyanate, 1,5-naphthalene diisocyanate, isophorone diisocyanate and the like; cycloaliphatic diisocyanates such as methylenebis(cyclohexyl isocyanate) including the 4,4'-isomer, the 2,4'-isomer and mixtures thereof, and all the geometric isomers thereof including trans/trans, cis/trans, cis/cis and mixtures thereof, cyclohexylene diisocyanates (1,2-; 1,3-; or 1,4-), 1-methyl-2,5-cyclohexylene diisocyanate, 1-methyl-2,4-cyclohexylene diisocyanate, 1-methyl-2,6-cyclohexylene diisocyanate, 4,4'-isopropylidenebis(cyclohexyl isocyanate), 4,4'-diisocyanatodicyclohexyl, and all geometric isomers and mixtures thereof and the like. Also included are the modified forms of methylenebis(phenyl isocyanate). By the latter are meant those forms of methylenebis(phenyl isocyanate) which have been treated to render them stable liquids at ambient temperature (circa 20° C.). Such products include those which have been reacted with a minor amount (up to about 0.2 equivalents per equivalent of polyisocyanate) of an aliphatic glycol or a mixture of aliphatic glycols such as the modified methylenebis(phenyl isocyanates) described in U.S. Pat. Nos. 3,394,164: 3,644,457; 3,883,571; 4,031,026; 4,115,429; 4,118,411; and 4,299,347. The modified methylenebis(phenyl isocyanates) also include those which have been treated so as to convert a minor proportion of the diisocyanate to the corresponding carbodiimide which then interacts with further diisocyanate to form uretone-imine groups, the resulting product being a stable liquid at ambient temperatures as described, for example, in U.S. Pat. No. 3,384,653. Mixtures of any of the above-named polyisocyanates can be employed if desired. Further, in the case of the preparation of those polyurethanes of the invention which are thermoset, it is possible to introduce into the polyisocyanate component employed in the reaction minor amounts (up to about 30 percent by weight) of polymethylene polyphenyl polyisocyanates. The latter are mixtures containing from about 20 to 90 percent by weight of methylenebis(phenyl isocyanate) the remainder of the mixture being polymethylene polyphenyl polyisocyanates of functionality higher than 2.0. Such polyisocyanates and methods for their preparation are well-known in the art; see, for example, U. S. Pat. Nos. 2,683,730; 2,950,263; 3,012,008 and 3,097,191. These polyisocyanates are also available in various modified forms. One such form comprises a polymethylene polyphenyl polyisocyanate as above which has been subjected to heat treatment, generally at temperatures from about 150° C. to about 300° C., until the viscosity (at 25° C.) has been increased to a value within the range of about 800 to 1500 centipoises. Another modified polymethylene polyphenyl polyisocyanate is one which has been treated with minor amounts of an epoxide to reduce the acidity thereof in accordance with U.S. Pat. No. 3,793,362.

Preferably the diisocyanates belong to the group comprising methylenebis(phenyl isocyanate), methylenebis(cyclohexyl isocyanate), and mixtures thereof including the various isomer components of both types set forth above.

In respect of the polyol component (iii), its use is optional but even if employed it will not be present in proportions which would lower the flexural modulus to values below 150,000 psi as measured in accordance with ASTM Test Method-D790. Accordingly, the expedient concentration for the polyol falls in the range from 0 to about 25 parts by weight per 100 parts of total urethane reactants based on (i) polyisocyanate, (ii) extender combination, and said polyol (iii). If it is selected for incorporation for whatever reason, for example, to increase the impact strength, elongation and tensile strength properties of the resulting plastics, then an advantageous range is from about 1 to about 10 parts per 100 parts of reactants, and preferably from about 1 to about 5 parts.

Polyol molecular weight has the minimum value expressed above. The term molecular weight as used herein refers to the number average molecular weight as determined by end-group analysis and other colligative properties. Advantageously, the molecular weight falls in the range of from about 500 to about 20,000, preferably from about 1,000 to about 10,000 and, most preferably, in the range of from about 1,000 to about 6,000. The functionality is advantageously not greater than about 6 and, preferably, the functionality falls in a range of about 2 to about 4. A most preferred class of polyols have functionalities of from about 2 to about 3 and molecular weight from about 1000 to about 6000.

Exemplary of the polyols which can be employed in the preparation of the polymers of the invention are: polyether polyols, polyester polyols, hydroxy-terminated polycarbonates, hydroxy-terminated polybutadienes, hydroxy-terminated polybutadiene-acrylonitrile copolymers, hydroxy-terminated copolymers of dialkyl siloxane and alkylene oxides such as ethylene oxide, propylene oxide and the like, and mixtures in which any of the above polyols are employed as major component (greater than 50% w/w) with amine-terminated polyethers and amino-terminated polybutadiene-acrylonitrile copolymers.

Illustrative of polyether polyols are polyoxyethylene glycols, polyoxypropylene glycols which, optionally, have been capped with ethylene oxide residues, random and block copolymers of ethylene oxide and propylene oxide, propoxylated tri- and tetrahydric alcohols such as glycerine, trimethylolpropane, pentaerythritol, and the like, which propoxylated compounds have been capped with ethylene oxide; polytetramethylene glycol, random and block copolymers of tetrahydrofuran and ethylene oxide and or propylene oxide, and products derived from any of the above reaction with di- or higher functional carboxylic acids or esters derived from said acids in which latter case ester interchange occurs and the esterifying radicals are replaced by polyether polyol radicals. The preferred polyether polyols are random and block copolymers of ethylene and propylene oxide of functionality approximately 2.0 and polytetramethylene glycol polymers of functionality greater than or equal to 2.0.

In a particular embodiment of the invention the polyol can be obtained by reacting any of the above polyether polyols with a di- or trifunctional aliphatic or aromatic carboxylic acid to form the corresponding polyether-esters. Examples of acids which can be used are adipic, azelaic, glutaric, isophthalic, terephthalic, trimellitic and the like. The polyether polyols which can be employed also include the vinyl reinforced polyether polyols, e.g. those obtained by the polymerization of styrene and or acrylonitrile in the presence of the polyether. Illustrative of polyester polyols are those prepared by polymerizing ε-caprolactone using an initiator such as ethylene glycol, ethanolamine and the like, and those prepared by esterification of polycarboxylic acids such as phthalic, terephthalic, succinic, glutaric, adipic azelaic and the like acids with polyhydric alcohols such as ethylene glycol, butanediol, glycerol, trimethylolpropane, 1,2,6-hexanetriol, cyclohexanedimethanol and the like.

Illustrative of the amine-terminated polyethers are the aliphatic primary di- and tri-amines structurally derived from polyoxypropylene glycols and triols. Polyether diamines of this type are available from Jefferson Chemical Company under the trademark JEFFAMINE.

Illustrative of polycarbonates containing hydroxyl groups are those prepared by reaction of diols such as propane-1,3-diol, butane-1,4-diol, hexan-1,6-diol, 1,9-nonanediol, 2-methyloctane-1,8-diol, diethylene glycol, triethylene glycol, dipropylene glycol and the like with diarylcarbonates such as diphenylcarbonate or with phosgene.

Illustrative of the silicon-containing polyethers are the copolymers of alkylene oxides with dialkylsiloxanes such as dimethylsiloxane and the like; see, for example, U.S. Pat. No. 4,057,595.

Illustrative of the hydroxy-terminated polybutadiene copolymers are the compounds available under the trade name Poly BD Liquid Resins from Arco Chemical Company. Illustrative of the hydroxy- and amine-terminated butadiene/acrylonitrile copolymers are the materials available under the trade name HYCAR hydroxyl-terminated (HT) Liquid Polymers and amine-terminated (AT) Liquid Polymers, respectively.

Generally speaking, the overall proportions of the components (i), (ii), and (iii) are such that the active hydrogen containing components (ii) and (iii) balance the isocyanate component (i) so that stoichiometric equivalency of the reactants is maintained. However, for various reasons it is not always possible nor desirable to meet the 1:1 equivalency. Advantageously, the proportions are such that the overall ratio of isocyanate groups to active hydrogen groups is in the range of from about 0.90:1 to about 1.15:1, and, preferably, from about 0.95 1 to about 1.10:1.

The use of an impact modifier while not in any way essential to the present polyurethane plastics does impart enhanced impact strengths to their molded products. Accordingly, the incorporation of an impact strength enhancing proportion of a polymeric impact modifying agent in the present compositions represents another embodiment in accordance with the present invention. The impact modifier may be added into the polyurethane reacting mixture either as a single component or in combination with one or more of the polyurethane forming ingredients. Alternatively, and, preferably, it can be admixed, preferably in comminuted form such as powder, pellets and the like with the finished polyurethane also in similarly comminuted form. The resulting physical mixture is then preferably homogenized and/or fluxed by conventional melt blending means such as by extrusion, milling, Banbury mixing, and the like. Where the polyurethane plastic is being prepared using a continuous twin screw reactor extruder or like apparatus the impact modifier may be added in any convenient manner, for example, it can be added initially with the reacting ingredients or at a later stage during polymer formation. The actual proportions are not critical provided no detrimental reductions to the heat resistance (i.e. $T_g$ value) of the polyurethanes occurs. Advantageously, the modifier is employed within a range of from about 3 to about 30 parts by weight per hundred parts of polyurethane. Preferably, it is employed in a range of from about 5 to about 15 parts.

The impact modifier can be any of the polymers known in the art to enhance impact strength in various types of polymers. A particularly useful group of such modifiers comprises those which have been conventionally employed in the art to impart improved impact properties to polyvinyl chloride and related polymers; see, for example, Encyclopedia of Polymer Science and Technology, Vol. 14, p. 417–418, 1971, Interscience Publishers, New York. A preferred group of impact improvers are the particulate rubbery impact modifiers. Illustrative of such modifiers are acrylonitrile-butadiene-styrene terpolymers, methyl methacrylatebutadiene-styrene terpolymers, chlorinated polyethylenes, ethylene-vinyl acetate copolymers, vinyl chloride-ethylenevinyl acetate graft polymers, polyethylene, copolymers of vinyl chloride with octyl acrylate or octyl fumarate, poly(alkyl acrylates), and the like. A particularly preferred group of impact modifiers for use in the blends of the invention is inclusive of multi-phase composite interpolymers based on poly(alkyl acrylates), methacrylate-butadiene-styrene copolymer rubbers and acrylonitrile-butadiene-styrene copolymer rubbers.

The multi-phase composite polymers are also recognized in the art by the term core-shell polymers. The multi-phase composite interpolymers are described in detail in U.S. Pat. No. 4,404,161 and the references cited therein, U.S. Pat. Nos. 3,808,180 and 4,096,202 disclosures of which relative to said multi-phase composite interpolymers are hereby incorporated herein by reference.

Preferred multi-phase composite interpolymers for use in accordance with the present invention have only two phases, the first phase comprising about 60 to 95 percent by weight of the interpolymer and being derived by polymerizing a monomer system comprising (a) 95 to 99.8 percent by weight butyl acrylate, (b) 0.1 to 2.5 percent by weight butylene diacrylate as crosslinking agent, and (c) 0.1 to 2.5 percent by weight allyl methacrylate or diallyl maleate as graftlinking agent, with a final phase of from about 40 to about 5 percent by weight polymerized from about 60 to 100 percent by weight methyl methacrylate.

The compositions of the invention can also incorporate various additives such as fillers, fiber glass, and the like, antioxidants, pigments, fire retardants, plasticizers, reinforcing agents, wax lubricants, and the like commonly employed in the art in such compositions.

The compositions of the invention can be obtained in both cellular and non-cellular form. The cellular compositions of the invention would be classified as microcellular and can be prepared by methods well recognized in the art. For example, a blowing agent can be incorporated in the reaction mixture employed in the preparation of the compounds described above. Preferably, the blowing agent is a volatile organic liquid which is vaporized during the exothermic reaction which takes place in forming the compositions of the invention but, in the case of those compositions which are thermoset, it is also possible to use water as the blowing agent. The reaction of the water with polyisocyanate utilized in the reaction mixture generates carbon dioxide which acts as the blowing agent. Examples of organic liquids which can be used as blowing agents are inert liquids, i.e. liquids which do not react chemically with any of the components of the reaction mixture and which do not interfere in any way with the desired course of the reaction, having boiling points in the range of about −20° C. to about 110° C. Illustrative of such liquids are butane, hexane, heptane, methylene chloride, chloroform, monofluorotrichloromethane, chlorodifluoromethane, dichlorodifluoromethane and the like.

In the case of the thermoplastic compositions of the invention which may be prepared and isolated in flake, pellet or like form and then be subsequently molded by injection molding and like techniques, it is also possible to prepare cellular compositions therefrom by blowing with inert gases such as nitrogen, air, carbon dioxide and the like during the final molding process using techniques well-known in the art for thermoplastic materials such as nylon, polycarbonate, polystyrene, polyethylene and the like.

In respect of the non-cellular polyurethanes of the invention, they are characterized by the high flexural modulus values of at least about 150,000 psi as determined by the test method set forth above.

However, the surprising and most unexpected characteristic is the greatly improved heat resistance of the present materials over the incorporated art. This is observed in their $T_g$ values of at least 125° C. which in turn is reflected in their higher heat deflection temperatures as measured in accordance with ASTM Test D648-56. Generally speaking their $T_g$ values fall in the range of about 130° C. to about 165° C. which means they can withstand elevated temperatures which are conservatively 10° to 60° C. greater than previous limits. One very outstanding feature of the present polyurethanes is the fact that in spite of their improved resistance to high temperatures, they are still easily melt fabricated without causing any harm to the polymer molecular weights or dependent physical properties.

Those polyurethanes of the invention which also possess outstanding optical clarity are particularly useful in the fabrication of medical devices which require both autoclavability and complete transparency. Such devices include surgical instrument trays for steam sterilization and the like.

Additionally, the polymers find utility in the areas already known for the prior art materials such as automobile body parts, equipment housings, mechanical goods, gears, gaskets and a wide variety of other such articles calling for high impact resistance and high modulus properties. The methods of fabrication can be any of those known in the art of molding thermoplastic or thermoset polyurethanes. Such methods include reaction injection molding and cast molding at the time of preparation and injection molding, compression molding, extrusion, blow molding, calendering, thermoforming and the like in the case of the finished polymer. The marked resistance of the polyurethanes of the invention to deformation or decomposition upon exposure to temperatures involved in melt processing greatly facilitates the fabrication of articles from the thermoplastic compositions of the invention.

The following examples describe the manner and process of making and using the invention and set forth the best mode contemplated by the inventors of carrying out the invention but are not to be construed as limiting.

EXAMPLE 1

The following experiment describes the preparation of a clear polyurethane plastic in accordance with the present invention.

A diol mixture is prepared by blending together 379.76 g. (3.27 moles) of 1,2-cyclohexanediol and 1100 g. (7.63 moles) of 1,4-cyclohexanedimethanol in a flask and heating the mixture to 80° C. during stirring which results in a homogeneous liquid mixture comprising 26 percent by weight of the cyclohexanediol. The mixture is heated for a 3 hour period at 80° C. under 10 mm. of mercury pressure. After this mixture is cooled to 60° C., a 543.6 g. sample is weighed into a beaker and mixed with 0.6 g. of FORMREZ UL-22 (a urethane catalyst supplied by Witco Chemical). This combination is then added to 1001.6 g. of molten 4,4'-methylenebis(phenyl isocyanate), stirred manually and rapidly for 2 seconds, and then immediately poured into an open tray which had been previously coated with a release agent. The cast product solidifies to a clear polyurethane and is allowed to cool to room temperature (circa 20° C.) before being chopped mechanically into relatively small pellets. The chopped material is dried by heating at 115° C. for 16 hours.

A 1260 g. sample of the clear polyurethane pellets is shaken together with 126 g. of a pelletized core/shell acryloid rubber supplied by Rohm and Haas Corporation under the trade name Paraloid KM-330 and 3.5 g. of E-wax (a wax lubricant supplied by AMERICAN HOECHST) all in a plastic bag. This combination is then melt extruded into a ¼" strand using a Brabender twin screw extruder under the following conditions screw speed = 18 rpm; torque 6.5 to 7 amps; barrel zone temperatures; zones 1, 2, and 3 all 230° C. The cooled strands are mechanically chopped (pelletized) and dried overnight in a dehumidifying drier at 90° C. to 110° C.

Test sheets and test bars of the opaque blend are injection molded from the pelletized blend using an Arburg 220E (2 oz.) injection molding machine under the following conditions:screw speed = 1.4; injection speed = 4.7; injection pressure = 600 psi; injection time and cooling time = 10 and 30 seconds respectively; barrel temperatures: zone 1 = 235° C.; zone 2 = 245° C.; zone 3 = 240° C.; mold temperature = 66° C.

The blended sample has the following properties:

| | |
|---|---|
| Tensile Strength (break psi) | 7165 |
| Tensile Modulus (psi × 10³) | 213.3 |
| Elongation (Break %) | 15 |

| -continued | |
|---|---|
| Flexural Strength (psi) | 15,645 |
| Flexural Modulus (psi × 10³) | 286 |
| $T_g$ (°C.)[1] | 140 |
| HDT (°C.)[2] | |
| at 66 psi | 134 |
| at 264 psi | 106 |

[1]$T_g$ is measured using a Mettler TA3000 thermal analyzer.
[2]HDT is the heat deflection temperature measured in accordance with ASTM Test Method D-648.

The $T_g$ and HDT data above is to be compared with corresponding measurements noted in U.S. Pat. No. 4,567,236 particularly where no polyols are employed; for example the polyurethane of Example 1, Table II of the patent wherein the extender is 1,6-hexanediol shows a $T_g$ of about 95° C. both as a pure polyurethane resin and as the blend with a KM-330 impact modifier; the HDT (at 264 psi) values for the pure polymer is 85° C. and 70° C. for the blend. The $T_g$ of 140° C. and HDT (at 264 psi) of 106° C. for the resin blend of the invention above are dramatically higher than the corresponding values for the reference material.

EXAMPLE 2

A clear polyurethane plastic in accordance with the present invention is prepared using the same procedure and apparatus set forth in Example 1 but employing the following ingredients and proportions by weight.

The starting diol mixture is prepared by heating together at 90° C. during stirring 202.78 g. (1.74 moles) of 1,4-cyclohexanediol, 1007 g. (6.98 moles) of 1,4-cyclohexanedimethanol, and 42.34 g. of an EO capped polyoxypropylene glycol having a molecular weight (number average) of about 4000. In terms of the two extenders alone the cyclohexanediol represents 17 percent by weight of the mixture. The mixture is heated at 90° C. under 10 mm. of mercury pressure for 1 hour. A cooled 1000 g. sample (at 70° C.) is weighed into a beaker and mixed with 0.75 g. of FORMREZ UL-22. The combination is then added to 1803.75 g. of molten 4,4'-methylenebis(phenyl isocyanate), stirred rapidly for 2 seconds and then immediately poured into an open tray previously coated with a release agent. The product solidifies to a clear polyurethane plastic and is cooled to room temperature (circa 20° C.) before mechanically pelletized. The pellets are dried at 118° C. for 16 hours.

A 1535 g. sample of the pellets is shaken together with 153 g. of the KM-330 described in Example 1 and 0.8 g. of FORMREZ UL-22. This mixture is melt extruded into ¼" strand using the Brabender apparatus under the following conditions:screw speed = 16 r.p.m.; torque 10 amps; barrel zone temperatures of 245° C. for all three zones. The cooled strands are chopped and dried overnight in the dehumidifying drier at 100° C.

Test sheets and bars of the opaque blend are injection molded from the pellets using the Arburg molder under the following conditions:screw speed = 1.8; injection speed = 4; injection pressure = 800 psi; injection time and cooling time = 12 and 36 seconds, respectively; barrel temperatures:zone 1 = 242° C.; zone 2 = 245° C.; zone 3 = 240° C.; mold temperature = 230° C.

The blended sample has the following properties:

| | |
|---|---|
| Tensile Strength (break psi) | 8986 |
| Tensile Modulus (psi × 10³) | 179.2 |
| Elongation (Break %) | 35 |

-continued

| | |
|---|---|
| Flexural Strength (psi) | 12,355 |
| Flexural Modulus (psi × 10³) | 272.4 |
| Tg (°C.) | 155 |
| HDT (°C.) | |
| at 66 psi | 138 |
| at 264 psi | 117 |
| Notched Izod Impact[1] ft. lbs./in. | 3.7 |

[1]Izod impact strength measured in accordance with ASTM D256-56.

Noteworthy is the increase in $T_g$ and HDT values of this sample over that of Example 1 above even though the cycloalkane diol content of the extender mixture is lower.

EXAMPLE 3

A polyurethane plastic in accordance with the present invention is prepared using the same procedure set forth in Example 1 but employing the following ingredients and proportions by weight.

The starting diol mixture is prepared by heating together 611.75 g. (2.545 moles) of hydrogenated bisphenol A [4,4'-isopropylidenebis(cyclohexanol)], 451.1 g. (3.817 mole) of 1,6-hexanediol, 74.4 g. of the polyethyleneoxy polypropyleneoxy glycol described in Example 2, 2.66 g. of E-wax, and 2.66 g. of Irganox 1010 (an antioxidant supplied by Ciba Geigy Corporation) at a temperature of 100° C. which results in a homogeneous liquid mixture. Based on the combined weights of the two extenders the hydrogenated bisphenol A represents 58 percent by weight. A cooled 250 g. portion of the liquid mixture is weighed into a beaker and mixed with 0.15 g. of stannous octoate and 379.73 g. of molten 4,4'-methylenebis(phenyl isocyanate), stirred rapidly for 2 seconds and then immediately poured into an open tray coated with a release agent. The product solidifies to a clear polyurethane plastic and after cooling to room temperature (circa 20° C.) is pelletized. The pellets are dried in a hopper drier at 99° C. overnight.

A 700 g. sample of the pellets is mixed in a polyethylene bag with 0.2 g. of dimethyl tin didodecyl mercaptide and this mixture extruded to ¼" strands using the Brabender apparatus under the following conditions:- screw speed=14 rpm; torque=7 to 8 amps; three barrel zones at 230° C. The extrudate is chopped and dried overnight at 100° C.

Test sheets and bars are injection molded from the dried extrudate using the Arburg injection molder under the following conditions:screw speed=1.6; injection speed=4.3; injection pressure=750 psi; injection and cooling times=10 and 28 seconds, respectively; barrel temperatures:zones 1 and 2=225° C.; zone 3=220° C.; mold temperature=110° C.

The blended sample has the following properties:

| | |
|---|---|
| Tensile Strength (break psi) | 7630 |
| Tensile Modulus (psi × 10³) | 155.2 |
| Elongation (Break %) | 26 |
| Flexural Strength (psi) | 14,280 |
| Flexural Modulus (psi × 10³) | 336.8 |
| Tg (°C.) | 137 |
| HDT (°C.) | |
| at 66 psi | 128 |
| at 264 psi | 112 |

EXAMPLE 4

The following experiment describes the preparation of five polyurethane plastics (runs 1 to 5, inclusive) in accordance with the present invention.

The diol mixtures in all five runs employ the diol extender mixture of hydrogenated bisphenol A (HBPA) and 1,4-cyclohexanedimethanol with the respective weight percentages of HBPA set forth in Table I. For runs 1 to 3 the diol mixtures are prepared identically to the procedure set forth in Example 2 using the same polyether diol and the same catalyst proportions both in the initial polymerization and subsequent melt extrusion steps. Runs 4 and 5 are run identically to 1 to 3 except the diol has a slightly lower molecular weight of 3800 and Irganox 1010 similar to Example 3 is employed. Reaction in all runs with molten 4,4'-methylenebis(phenyl isocyanate) is identical to previous runs employing dimethyltin didodecyl mercaptide catalyst. The melt extrusion and injection molding conditions are virtually the same as used in previous examples. Where applicable, the impact modifier concentration is the same as set forth in previous experiments (10% w/w).

The $T_g$ and HDT values set forth in Table I for these compositions shows clearly their increased resistance to high temperatures when compared with those values of the prior art as noted in Example 1 above. Further, it will be noted that the presence or absence of impact modifier has little or no effect on polyurethane heat resistance. The tensile and flexural properties represent excellent values for a stiff hard polyurethane plastic.

TABLE I

| | Run No. | | | | |
|---|---|---|---|---|---|
| | 1 | 2 | 3 | 4 | 5 |
| HBPA (wt. %)[1] in extender | 29 | 42 | 42 | 53 | 53 |
| extender | | | | | |
| Impact Modifier | KM-330 | KM-330 | KM-653[2] | KM-330 | — |
| Properties: | | | | | |
| Tensile strength (psi) | 8705 | 8764 | 9286 | 8194 | 8133 |
| Tensile modulus (psi × 10³) | 208.1 | 192.6 | 218.9 | 238.2 | 277 |
| Elongation (%) | 31 | 18 | 18 | 20 | 10 |
| Flex. strength (psi) | 11,300 | 12,566 | 13,099 | 12,457 | 12,004 |
| Flexural modulus (psi × 10³) | 252.6 | 283 | 297 | 269.2 | 313.7 |
| Tg (°C.) | 151 | 149 | 154 | 164 | 166 |
| HDT (°C.) | | | | | |
| at 66 psi | 140 | 138 | 146 | 147 | 148 |
| at 264 psi | 129 | 126 | 132 | 133 | 138 |

[1]HBPA: Hydrogenated bisphenol A.
[2]KM-653: Is another core/shell polymer supplied by Rohm and Haas.

EXAMPLE 5

Using the same hand-mix procedure described in Example 1 above a clear polyurethane plastic in accordance with the present invention is obtained as follows.

The diol mixture is prepared by heating together 379.7 g. (3.27 moles) of 1,2-cyclohexanediol and 1100 g. (7.63 moles) of 1,4-cyclohexanedimethanol at 80° C. providing a homogeneous liquid mixture. Heating at 80° C. under a pressure of 10 mm. of mercury is carried on for about 3 hours. After cooling to about 60° C., a 281.06 g. sample of the mixture is rapidly stirred with 541.93 g. of 4,4'-methylenebis(cyclohexyl isocyanate) for about 10 seconds and then immediately poured into the open tray where the cast product is allowed to solidify to a clear polyurethane. The solid is chopped into pellets and dried at 115° C. for 16 hours. The pellets are compression molded at 220° C. and about 12,700 psi to obtain a clear colorless sheet of polyurethane plastic measuring 5 inches×5 inches×⅛ inch. The following properties are determined on samples cut from the sheets except as noted below for the light transmission and yellow color listing.

| | |
|---|---|
| Tg (°C.) | 132 |
| Flexural Modulus (psi × $10^3$) | 504.5 |
| Flexural Strength (psi) | 13,552 |
| Light Transmittance[1] | 89.55% |
| Yellow Index[2] | 1.92 |

[1]Light Transmittance measured on injection molded disks measuring 2 inches diameter × ⅛" thick using light of D6500 Kelvin and measuring transmittance using a Pacific Scientific Spectrogard Color System, Silver Spring, Maryland 20910.
[2]Yellow index was measured using ASTM E313 standard at a two degree observer angle; test carried out on the disks noted in footnote 1 above using the same Spectrogard instrument.

The high modulus value shows the stiffness of the polyurethanes with excellent light transmission and very low yellow index coloration. The light transmission is the percent transmittance of a source light almost identical with natural light. Yellow index is a comparison measure of yellow color against standards and the lower the index, the greater the lack of any yellow tinge to the sample.

Similarly, to Example 1 above wherein a comparison of the $T_g$ was made with the prior art U.S. Pat. No. 4,567,236, Example 1 of $T_g$=95° C., the $T_g$ of 132° C. for the present example is dramatically higher than the 95° C. value of the reference, in spite of the fact that the prior sample was based on aromatic diisocyanate, whereas this present example is based on a cycloaliphatic diisocyanate.

EXAMPLE 6

Using the same procedure and conditions set forth in example 5 a polyurethane plastic of the present invention is prepared as follows.

The starting diol mixture is prepared from 202.78 g. (1.74 moles) of 1,4-cyclohexanediol, 1007 g. (6.98 moles) of 1,4-cyclohexanedimethanol, and, additionally 42.34 g. of the polyether diol described in Example 1 above. The mixture is heated at 90° C. to form the homogeneous blend. A 191.35 g. sample of the mixture is then mixed with 0.3 g. of UL-22 urethane catalyst supplied by Witco Chemical Corporation followed by hand-mixing with 361.72 g. of 4,4'-methylenebis(cyclohexyl isocyanate) for 2 seconds then cast into a tray where the product solidifies to a clear colorless polyurethane. It is chopped into pellets, dried at 115° C. for 16 hours, then compression molded using the conditions of Example 5 into sheets 5 inches×5 inches×⅛ inch. The following properties are determined.

| | |
|---|---|
| Tg (°C.) | 137 |
| Flexural Modulus (psi × $10^3$) | 422.1 |
| Flexural Strength (psi) | 14,090 |
| Light Transmittance | 90.27% |
| Yellow Index | 1.50 |

EXAMPLE 7

This example describes another hand-mix preparation of a polyurethane plastic of the present invention using the procedures of Example 5.

The diol mixture is prepared by heating together at 90° C. 294.16 g. (1.22 moles) of 4,4'-isopropylidenebis(cyclohexanol), 705.84 g. (4.89 moles) of 1,4-cyclohexanedimethanol, and 34.9 g. of the polyether diol described in the previous examples. A 153.6 g. sample of the degassed mixture is mixed with 0.2 g. of UL-22 followed by 2 seconds mixing with 246.21 g. of 4,4'-methylenebis(cyclohexyl isocyanate) and casting into a tray. The clear colorless polyurethane, when cooled and hardened, is chopped into pellets dried at 115° C. for 16 hours then compression molded into the 5 inch×5 inch×⅛ inch sheets using the above described molding conditions. The following properties are determined.

| | |
|---|---|
| Tg (°C.) | 146 |
| Flexural Modulus (psi × $10^3$) | 443.7 |
| Flexural Strength (psi) | 9,525 |
| Light Transmittance | 90.50% |
| Yellow Index | 1.04 |

EXAMPLE 8

This example describes another hand-mix preparation of a polyurethane plastic of the present invention using the procedure of Example 5 except for the injection molding of the resultant polymer.

The diol mixture is prepared by heating together at 90° C. 789.58 g. (3.28 moles) of 4,4'-isopropylidenebis(cyclohexanol), 710.4 g. (4.93 moles) of 1,4-cyclohexanedimethanol, and 52.5 g. of the polyether diol described above in previous examples. A 250 g. sample of this diol mixture is mixed with 0.15 g. of UL-22 and then stirred rapidly for 2 seconds with 347 g. of 4,4'-methylenebis(cyclohexyl isocyanate). The product is quickly cast into a try and the resulting clear colorless polyurethane chopped into pellets after it is cooled and solidified.

The chopped polymer is injection molded into test sheets using the Arburg described above under the following conditions:screw speed=75 r.p.m.; injection speed=4.1; injection pressure=670 psi; injection and cooling times=10 and 38 seconds, respectively; barrel temperature:zone 1=225° C.; zones 2 and 3=230° C.; mold temperature=95° C. The following properties are determined.

| | |
|---|---|
| Tg (°C.) | 153 |
| Flexural Modulus (psi × $10^3$) | 260.2 |
| Flexural Strength (psi) | 4,984 |
| Light Transmittance | 87.17% |
| Yellow Index | 4.13 |

We claim:

1. In a polyurethane plastic prepared from (i) an organic polyisocyanate, (ii) at least one chain extender, and (iii) 0 to about 25 parts by weight per 100 parts of total polyurethane reactants of a polyol having a functionality of at least 2 and a molecular weight of at least 500, the improvement which comprises employing as said extender (ii) a combination comprising (a) at least one cycloalkane diol selected from the group consisting of diols obtained by replacing two nuclear hydrogen atoms of a cycloalkane having from 4–12 cycloaliphatic carbon atoms by —OH groups and diols having the formula

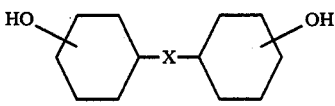

wherein X is selected from the group consisting of a direct bond —SO₂—, —CO—, —O—, and lower-alkylene and (b) at least one other extender.

2. A polyurethane plastic according to claim 1 wherein said polyisocyanate is selected from the group consisting of aromatic diisocyanates, cycloaliphatic diisocyanates, and mixtures thereof.

3. A polyurethane plastic according to claim 1 wherein said polyisocyanate is an aromatic diisocyanate.

4. A polyurethane plastic according to claim 1 wherein said polyisocyanate is a cycloaliphatic diisocyanate.

5. A polyurethane plastic according to claim 1 wherein said extender (iia) is selected from the group consisting of cyclohexylene diols, isopropylidenebis(cyclohexanols), and mixtures thereof.

6. A polyurethane plastic according to claim 1 wherein said extender (iib) comprises an aliphatic diol having from 2 to 10 carbon atoms.

7. A polyurethane plastic according to claim 1 wherein said extender combination comprises from about 10 to about 90 percent by weight of said cycloalkane diol (a) and from about 90 to about 10 percent of said other extender (b).

8. A polyurethane plastic according to claim 1 wherein said polyol (iii) comprises from about 1 to about 10 parts per 100 of said polyurethane reactants and has a functionality of from about 2 to about 3 and molecular weight from about 1000 to about 6000.

9. A polyurethane plastic according to claim 1 wherein the proportions of components (i), (ii), and (iii) are such that the overall ratio of isocyanate groups to active hydrogen groups is in the range of from about 0.95:1 to about 1.10:1.

10. A polyurethane plastic according to claim 1 additionally comprising an impact strength enhancing proportion of a polymeric impact modifying agent.

11. A polyurethane plastic comprising the product of reaction of
(i) a diisocyanate selected from the group consisting of methylenebis(phenyl isocyanate), methylenebis(cyclohexyl isocyanate), and mixtures thereof;
(ii) an extender combination comprising:
(a) from about 10 to about 90 percent by weight of a cycloalkane diol selected from the group consisting of cyclohexylene diols, isopropylidenebis(cyclohexanols), and mixtures thereof; and
(b) from about 90 to about 10 percent by weight of an aliphatic diol having from 2 to 10 carbon atoms; and
(iii) from 0 to about 25 parts by weight per 100 parts of total polyurethane reactants (i), (ii), and (iii) of a polyol having a functionality of from about 2 to about 3 and a molecular weight from about 1000 to about 6000,
wherein the proportions of (i), (ii), and (iii) are such that the overall ratio of isocyanate groups to active hydrogen groups is in the range of from about 0.95:1 to about 1.10:1.

12. A polyurethane plastic according to claim 11 additionally comprising an impact strength enhancing proportion of a polymeric impact modifying agent.

13. A polyurethane plastic according to claim 11 wherein said diisocyanate is 4,4'-methylenebis(phenyl isocyanate).

14. A polyurethane plastic according to claim 13 wherein said polyol (iii) is present in the proportions of from about 1 to about 10 parts by weight per 100 parts of polyurethane reactants (i), (ii), and (iii).

15. A polyurethane plastic according to claim 14 wherein said polyol is a polyether diol having a molecular weight of from about 2000 to about 5000.

16. A polyurethane plastic according to claim 15 wherein said extender combination comprises 4,4'-isopropylidenebis(cyclohexanol) and 1,6-hexanediol.

17. A polyurethane plastic according to claim 15 wherein said extender combination comprises 4,4'-isopropylidenebis(cyclohexanol) and 1,4-biscyclohexanedimethanol.

18. A polyurethane plastic according to claim 17 additionally comprising from about 3 to about 30 parts by weight per hundred parts of polyurethane of a polymeric impact modifier comprising a multi-phase composite interpolymer.

19. A polyurethane plastic according to claim 15 wherein said extender combination comprises 1,4-cyclohexane diol and 1,4-biscyclohexanedimethanol and said plastic additionally comprises from about 3 to about 30 parts by weight per hundred parts of polyurethane of a polymeric impact modifier comprising a multi-phase composite interpolymer.

20. A polyurethane plastic according to claim 13 wherein said polyol content is zero, the extender combination comprises 1,2-cyclohexanediol and 1,4-biscyclohexanedimethanol and said plastic additionally comprises from about 3 to about 30 parts by weight per hundred parts of polyurethane of a polymeric impact modifier comprising a multi-phase composite interpolymer.

21. A polyurethane plastic according to claim 11 wherein said diisocyanate is 4,4'-methylenebis(cyclohexyl isocyanate).

22. A polyurethane plastic according to claim 21 wherein said polyol (ii) is a polyether diol having a molecular weigh of from about 2000 to about 5000 an is present in the proportions of from about 1 to about 10 parts by weight per 100 parts of (i), (ii), and (iii).

23. A polyurethane plastic according to claim 22 wherein said extender combination comprises 4,4'-isopropylidenebis(cyclohexanol) and 1,4-biscyclohexane dimethanol.

24. A polyurethane plastic according to claim 22 wherein said extender combination comprises 1,4-cyclohexane diol and 1,4-biscyclohexane dimethanol.

25. A polyurethane plastic according to claim 21 wherein said polyol content is zero and the extender combination comprises 1,2-cyclohexanediol and 1,4-biscyclohexane dimethanol.

* * * * *